United States Patent [19]

Chenoweth

[11] Patent Number: 4,726,534
[45] Date of Patent: Feb. 23, 1988

[54] CONVERTIBLE REEL ASSEMBLY

[75] Inventor: Dean B. Chenoweth, Minneapolis, Minn.

[73] Assignee: Advantek Inc., Minneapolis, Minn.

[21] Appl. No.: 893,698

[22] Filed: Aug. 6, 1986

[51] Int. Cl.[4] .................. B65H 75/22; B25G 3/00
[52] U.S. Cl. ........................ 242/71.9; 403/346; 403/348
[58] Field of Search ........... 242/71.8, 71.9, 118.61, 242/118.8; 403/346, 348

[56] References Cited

U.S. PATENT DOCUMENTS

| | | | |
|---|---|---|---|
| 1,050,371 | 1/1913 | Merkel | 242/71.8 |
| 2,047,434 | 7/1936 | Schurmann | 242/118.61 |
| 2,494,612 | 1/1950 | Goldberg et al. | 242/71.8 |
| 2,605,057 | 7/1952 | Faulkner et al. | 242/71.8 |
| 3,041,005 | 6/1962 | Wallace | 242/71.8 |
| 3,176,932 | 4/1965 | Kovaleski | 242/118.8 |
| 3,468,492 | 9/1969 | Cragg | 242/71.8 |
| 3,743,209 | 7/1973 | Anderson | 242/118.61 |
| 4,002,309 | 1/1977 | Ruiz-Barbotteau | 242/71.8 |
| 4,234,137 | 11/1980 | Watanabe et al. | 242/71.8 |

*Primary Examiner*—Stuart S. Levy
*Assistant Examiner*—Joseph J. Hail, III
*Attorney, Agent, or Firm*—Burd, Bartz & Gutenkauf

[57] ABSTRACT

A tape accommodating reel assembly having reel sections with hubs that are interlocked together. Each hub has ears and locking lips. The ears and locking lips of mating hubs interengage each other to hold the hubs together. The widths of the hubs vary so that reel assemblies having different sizes can be made from a minimum of different reel sections.

26 Claims, 14 Drawing Figures

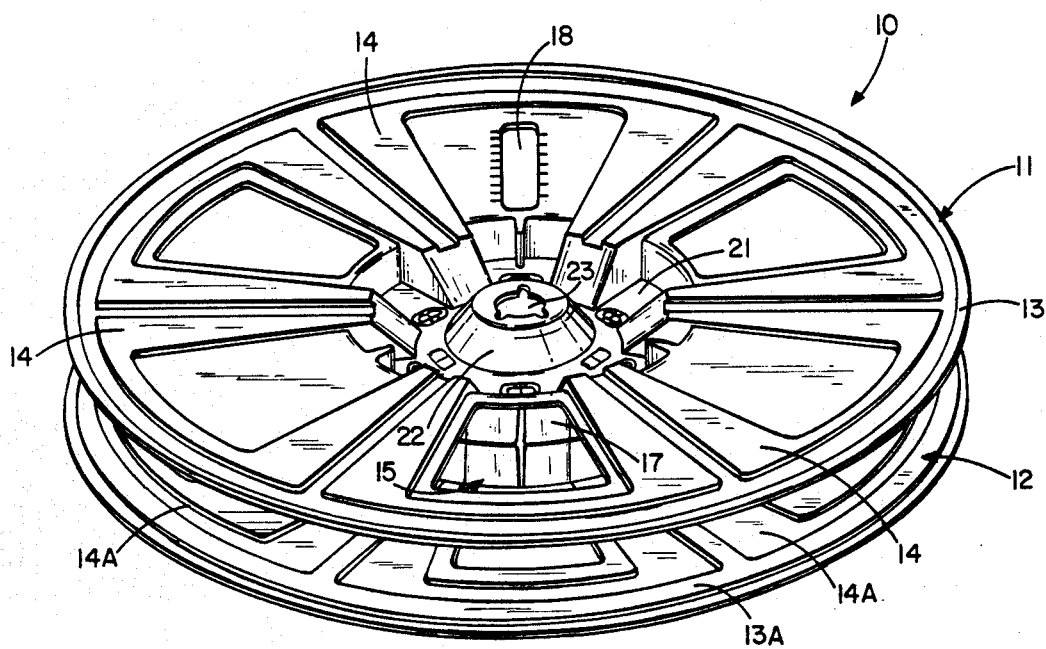
FIG. 1
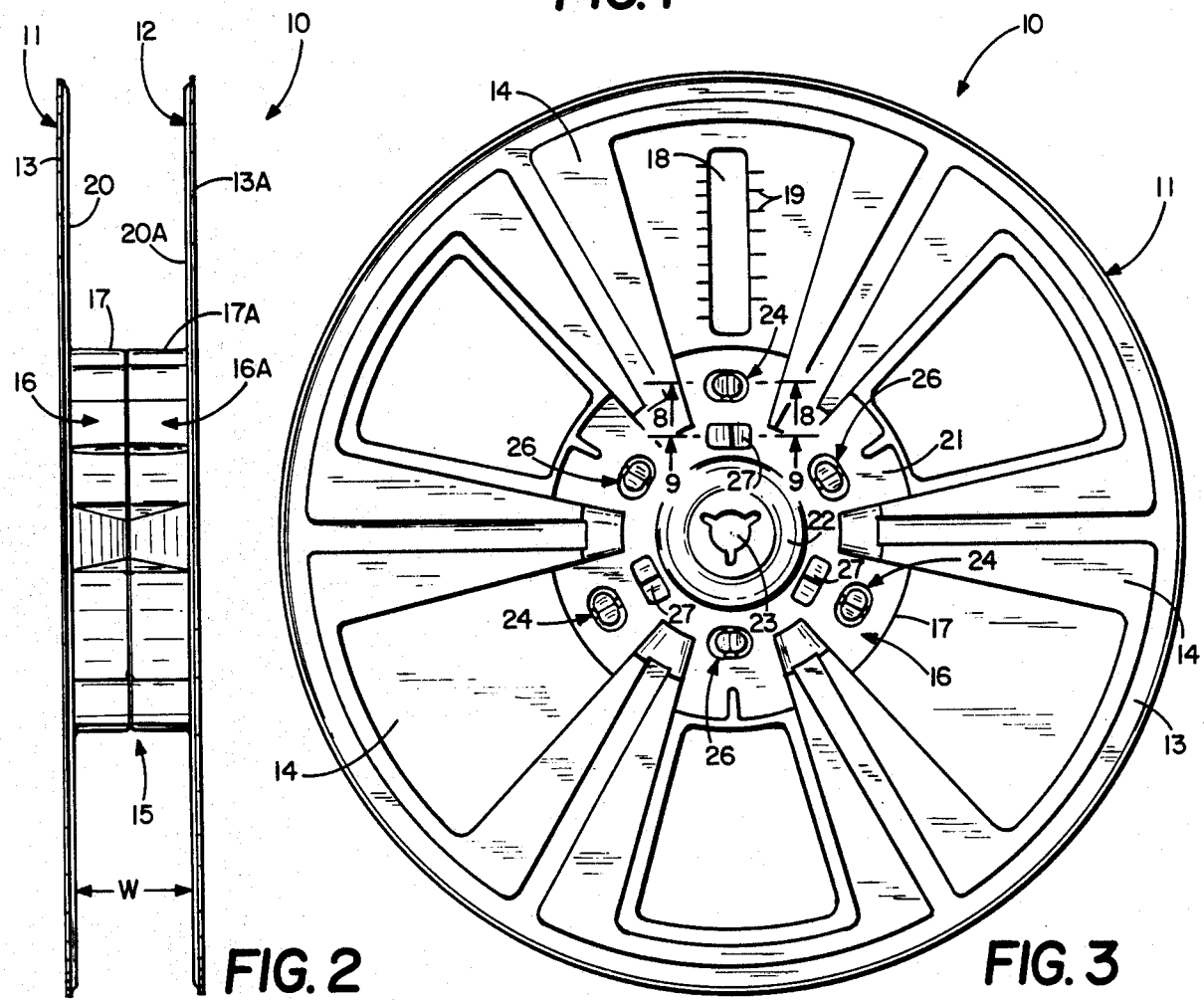
FIG. 2
FIG. 3

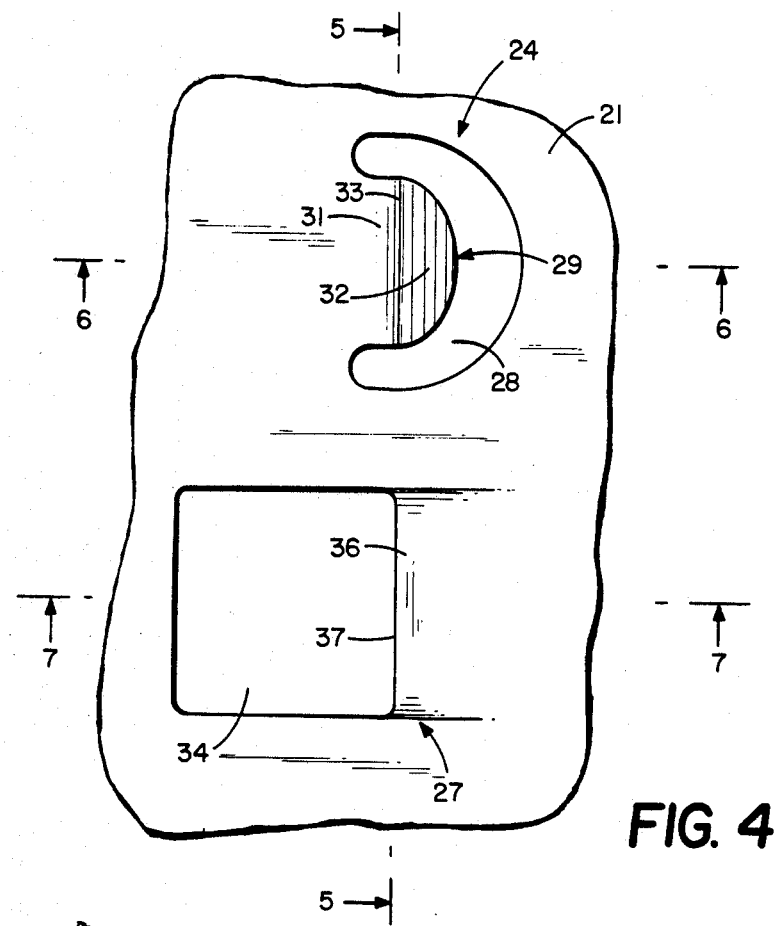
FIG. 4
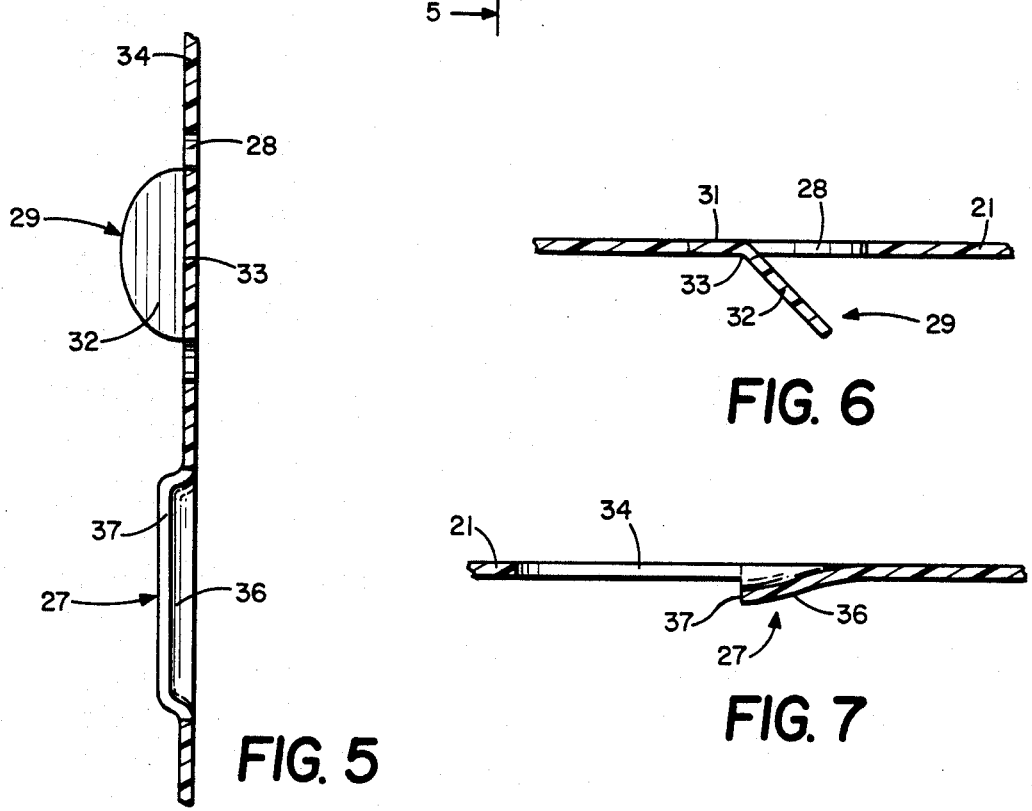
FIG. 5
FIG. 6
FIG. 7 and 4,726,534

CONVERTIBLE REEL ASSEMBLY

FIELD OF INVENTION

The invention is directed to tape and film storage structures. The storage structures are reels and drums having central hubs and circular side members for storing a ribbon of flexible sheet material, such as tape and film.

BACKGROUND OF THE INVENTION

Tapes, films, and other elongated sheet members are commonly stored on reels. The reels have a central hub attached to outwardly directed circular side walls. One end of the tape is attached to the central hub so that when the reel is rotated, the tape is wound on the reel. Reels having a central hub and outwardly directed circular side walls have been made out of metal, paper, and plastic. The central hubs of adjacent plastic reels are heat sealed together to form a unitary reel. Adhesives have also been used to bond reel hubs together. Low cost disposable reels have been made with a center plastic foam core and circular side members of paper. Adhesive is used to secure the paper side members to opposite sides of the core. The paper tends to pick up dust and dirt and absorbs moisture. Completed reels have been made with injection plastic molding procedures. The entire molded plastic reel is a one piece structure having a central hub and a pair of outwardly directed circular side members. The plastic molded reels are costly to manufacture and require separate molds for each reel size. The prior art reels for tapes, films, and the like are completed at the manufacturing plant. They are bulky and require considerable space for shipment and storage. Common reels parts cannot be interchanged to make reels having different sizes.

SUMMARY OF INVENTION

The invention relates to a reel assembly having interconnected reel sections with hubs that allow the reel sections to be nested together to provide efficient and compact structure for storage and shipment. Three reel sections having different hub widths are used to make six different sized reel assemblies. The use of only three reel sections to make a plurality of reel assemblies reduces the amount of inventory as well as the cost of manufacturing the reel assemblies.

The reel assemblies are made of compatible reel sections that are interlocked together. Each reel section has a circular side wall surrounding a central hub. The hub has an inwardly directed wall joined to a base wall offset from the plane of the side wall. The base wall has a plurality of interlocking ears and locking lips. The ears on adjacent base walls of the pairs of reel sections that make up the reel assembly interengage each other and bias the base walls of the adjacent base walls into surface engagement with each other. The locked lips overlap each other and prevent the interengaging ears from disengaging each other.

The reel assembly of an embodiment of the invention accommodates an elongated ribbon of flexible sheet material, such as laminated sheet material packaging a plurality of parts, electrical components, and the like. The reel assembly has first and second reel sections that are interlocked together with ears and locking lips. Each reel section has a central hub with a base wall laterally spaced from a generally circular side wall. The base wall has a plurality of flexible ears that extend in a first circumferential direction. A generally semi-circular slot is located around each ear. Each ear has a first generally flat section that projects into the slot and a second section joined to the first section. The second section is inclined outwardly from the plane of the base wall. The ears of the first reel section project through the slots in the base wall of the second reel section. In a similar manner, the ears of the second reel section project through the slots in the base wall of the first reel section. The generally flat first sections of the adjacent pairs of ears are located in engagement with each other and bias the base walls into surface engagement with each other. The base wall has a plurality of locking lips that hold the pairs of ears in engagement with each other. Holes in the base wall adjacent locking lips insure that the base walls are located in generally surface engagement with each other. The ears of each reel section comprise a pair of concentric rings of circumferentially spaced ears. The locking lip means comprise a ring of lips that project laterally from the base wall. Each lip is located adjacent the hole in the base wall so that the lips of the adjacent reel sections can engage each other to prevent the reverse rotation and radial movement of the reel sections relative to each other and thereby hold the pairs of ears in engagement with each other. Each hub has a central boss provided with an opening for accommodating a support, such as a shaft for the reel assembly. The hubs have annular walls means that provide a generally cylindrical body for accommodating the sheet material. Each hub has a selected lateral dimension so that the lateral dimension of the body can vary to accommodate different widths of sheet material. The interlocking ears and locking lips of the different sized hubs of the reel sections are interchangeable so that different sized reel assemblies can be made with a minimum number of reel sections. Six different sized reel asemblies can be made from combinations of three reel sections having different sized hubs. The use of three sizes of reel sections substantially reduces the amount of inventory necessary for the user to make up desired reel assemblies. The reel sections are nested together for storage and shipment. Reel sections having the selected hubs are snapped together at the location of utilization.

These and other features and advantages of the reel assembly and reel sections are set out in the following disclosure and drawings.

DESCRIPTION OF DRAWING

FIG. 1 is a perspective view of the connectible reel assembly of the invention;

FIG. 2 is a side view of the reel assembly of FIG. 1;

FIG. 3 is an enlarged plan view of the reel assembly of FIG. 1;

FIG. 4 is an enlarged view of a portion of the hub of a reel section;

FIG. 5 is a sectional view taken along the line 5—5 of FIG. 4;

FIG. 6 is a sectional view taken along the line 6—6 of FIG. 4;

FIG. 7 is a sectional view taken along the line 7—7 of FIG. 4;

DESCRIPTION OF PREFERRED EMBODIMENT

Figure 8:
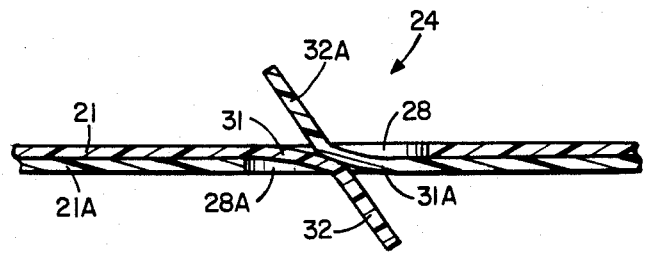
FIG. 8 is an enlarged sectional view taken along the line 8—8 of FIG. 3.

Referring to FIGS. 1 to 3, there is shown the reel or spool assembly of the invention indicated generally at 10 for accommodating flexible sheet material, such as film, tape, and like elongated ribbons. The sheet material can be laminated sheets enclosing objects, such as electronic components. Reel assembly 10 has a pair of reel sections 11 and 12 that are interlocked together with a central cylindrical body 15. Reel section 11 has a circular outer rim 13 joined to radially inwardly directed spokes 14. Spokes 14 are integral with a central cylindrical hub 16. Hub 16 has an outer arcuate wall 17 which forms part of central body 15 of reel 10. Spokes 14 are separate arcuate segments of a circle. Each spoke is a generally flat segment having a plurality of radial grooves and inwardly directed radial ribs 20. The ribs 20 are lateral spacers that extend in a radial direction outwardly from hub 16 to space the edge of the wound sheet material from side member 13. Wall 17 projects inwardly from the inner ends of spokes 14. Wall 17 comprises a plurality of convex wall sections. Adjacent convex wall sections are spaced from each other with recesses located about hub 16. One of spokes 14 has an elongated radial slot 18 to provide a visual indication as to the amount of sheet material that is carried on the reel assembly. A plurality of radially disposed indicator marks 19 on spoke 14 adjacent opposite sides of slot 19 provide visual information as to the amount of sheet material on reel assembly 10.

Hub 16 has a generally flat base wall 21 joined to wall 17. Base wall 21 is generally parallel to side wall 13. The central portion of base wall 21 has an outwardly directed cone-shaped boss 22. The center of boss 22 has an opening 23 with radial recesses to accommodate a spindle, shaft, or a like support. The entire reel section 11 is a one-piece plastic member. The plastic member is vacuum formed from sheet plastic. Other methods of manufacture can be used to make reel section 11.

Reel section 12 is identical to reel section 11. The parts of reel section 12 that correspond with parts of reel section 11 have the same reference numeral with the suffix A.

Hubs 16 and 16A have interlocking structures that hold the base walls 21 and 21A of the hub in firm surface or side-by-side engagement with each other and thereby form a complete reel assembly 10. The interlocking structures comprise an outer circle of interengaging ears 24 and an inner circle of interengaging ears 26. As shown in FIG. 3, the outer circle of ears 24 have three pairs of circumferentially spaced interengaging ears. The inner circle also has three pairs of circumferentially spaced interengaging ears. A plurality of locks 27 are located circumferentially between the inner circle of ears 26. Each of the interlocking ears is identical. FIG. 4 shows ear 24 as having a generally semi-circular or crescent-shaped slot 28 in base wall 21. An ear or tab 29 extends into slot 28. Ear 29 has a generally flat base section 31 joined to a semi-circular outer end section 32 along a bend line 33. Semi-circular section 32 has a radius of curvature that is smaller than the outer edge of wall 21 forming semi-circular slot 28 so that base section 31 of ear 29 can flex. As shown in FIG. 6, base section 31 is located generally along the same plane as base wall 21. The semi-circular outer end section 32 projects outwardly at an angle of about 45 degrees from the plane of base wall 21. Other angles of inclination of end section 32 can be used.

Lock 27 is located adjacent a hole 34 in base wall 21. The lock 27 comprises a outwardly directed locking lip 36 having one edge 37 of wall 21 forming hole 34. The outer linear edge 37 of lip 36 is radially aligned with inner part of base section 31 of ear 29 as shown in FIG. 4.

As shown in FIG. 8, when interengaging ears 24 contact each other the base walls 21 and 21A are in surface engagement with each other. The base sections 31 and 31A of the ears are biased outwardly in opposite directions and hold base walls 21 and 21A in engagement with each other. The outward flexing of base sections 31 and 31A continuously biases the walls 21 and 21A into surface engagement with each other to form body 15. The semi-circular outer end sections 32 and 32A function as interengaging ramps that guide the base sections 31 and 31A into interengaging relationship during the connection procedure of the reel sections.

Figure 9:
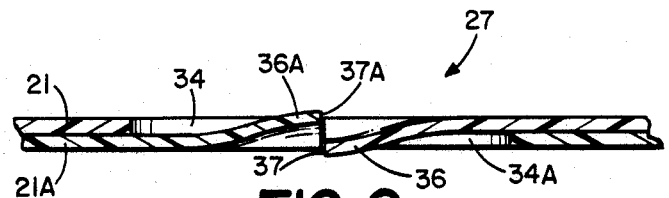
FIG. 9 is an enlarged sectional view taken along the line 9—9 of FIG. 3.

Referring to FIG. 9, lock 27 prevents reverse or backward rotation of reel sections 11 and 2 thereby maintaining the interlocking ears 24 and 26 in holding relation with each other. The lips 36 and 36A of the interengaging locks project into holes 34A and 34 respectively so that middle portions of edges 37 and 37A are spaced from each other with opposite portions of the edges engaging each other thereby preventing reverse rotation of reel sections 11 and 12 relative to each other.

Reel sections 11 and 12 can be coated with electrical anti-static coating material. This eliminates electrical discharge which could damage electrical components and collect dirt on the sheet material or tape. Small electrical components may adhere to the cover sheet of the tape due to electrostatic charge. This problem is eliminated with the use of a anti-static coating material applied to the reel section surfaces.

Figures 10, 11, 12, 13, 14:
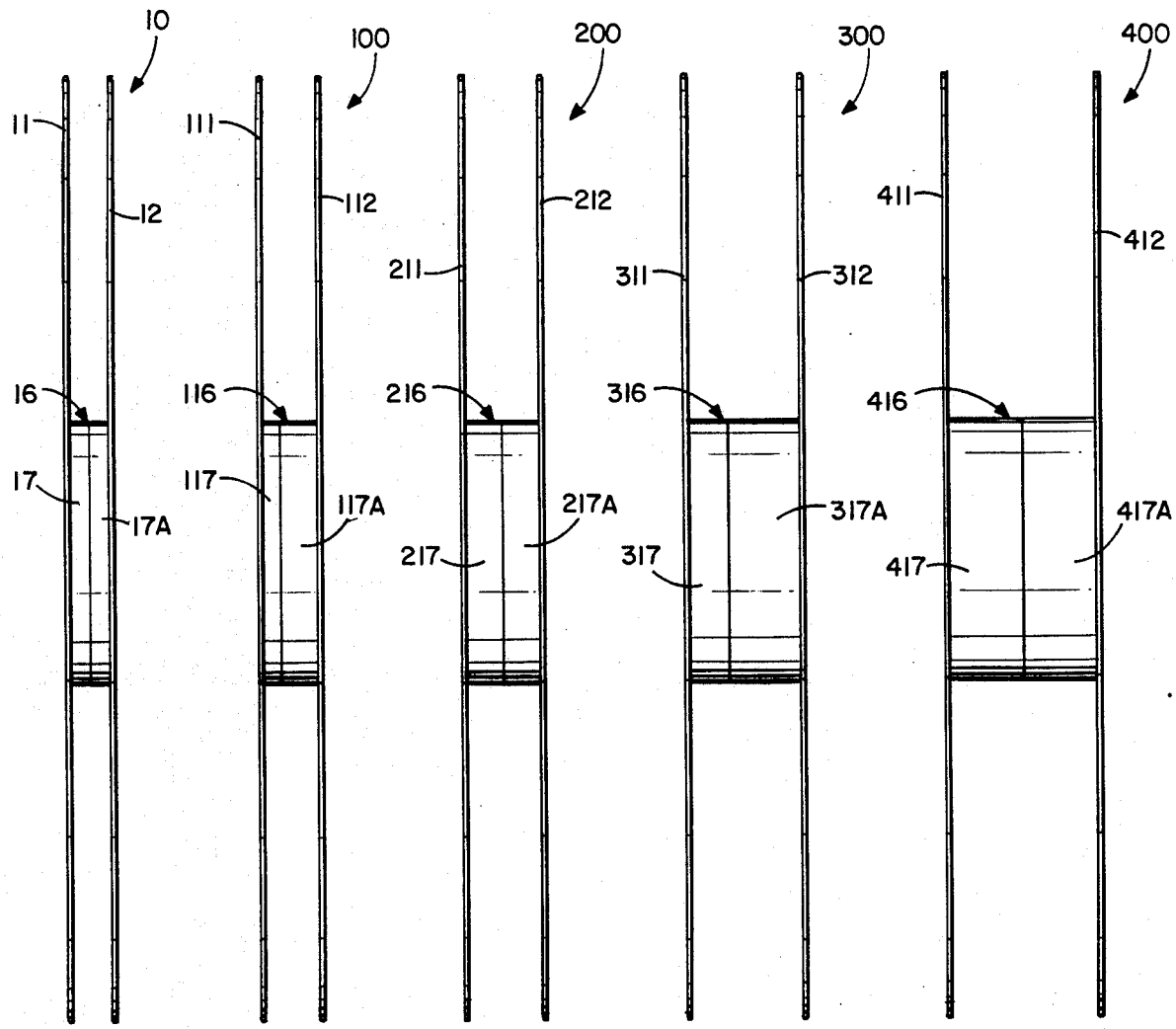
FIGS. 10 to 14 are diagrammatic side view of the reel assembly of the invention showing five different sized reel assemblies made from reel sections having three different thicknesses of hubs.

Reel sections 11 and 12 are made with hubs having three different sizes. Additional size variations can be made in the hubs and side members of the reel sections. The diameter of the side members are preferably 18 cm or 33 cm. All the hubs have common interlocking circles of ears 24 and 26 and locks 27. The thicknesses or width of arcuate walls 17 of the reel sections has three different sizes, for example, 4 mm, 8 mm, and 16 mm. As shown in FIG. 10, when reel sections 11 and 12 are interlocked to form cylindrical body 16, the width of hub walls 17 and 17A are combined to form the width of cylindrical body 16. In other words, as shown in FIG. 2, the lateral distance W between side members 13 and 13A is the combined widths of the hubs of the reel sections. FIG. 10 shows the width of each hub wall 17 and 17A as 4 mm. The resultant body 16 has a width of 8 mm.

FIG. 11 shows reel 100 having reel sections 111 and 112 connected together to form the central body or hub 116. Hub wall 117 has one half the width of the hub wall 117A. When hub wall 17A has a width of 4 mm and hub wall 117A has a width of 8 mm, the total width of hub 116 is 12 mm.

Referring to FIG. 12, there is shown a reel 200 having reel sections 211 and 212 connected together forming the central body or hub 216. Hub 216 is formed by hub walls 217 and 217A. These walls 217 and 217A have a common width, for example, 8 mm. The result is a central body having a width of 16 mm.

Referring to FIG. 13, there is shown a reel 300 having reel sections 311 and 312 joined together forming the central body or hub 316. Hub 316 comprises the hub walls 317 and 317A. Hub wall 317A is twice the width of hub wall 17. When hub wall 17 has a width of 8 mm and hub wall 317A has a width of 16 mm, the total width of hub 316 is 24 mm.

FIG. 14 shows the reel 400 comprising reel sections 411 and 412 joined together forming the central body hub 416. Hub 416 comprises the hub wall 417 and 417A which have equal widths. When these widths are 16 mm, the hub 416 has a width of 32 mm.

The use of three reel sections having hubs of different width substantially reduces the amount of inventory necessary to provide a reel assembly having one of the five hub dimensions shown in FIGS. 10 to 14. There is an economy in manufacturing as only three different molds are used to vacuum form the plastic reel sections. The reel sections are stacked together to minimize storage space and economize the shipment of the reel sections to a utilization locations.

In use, reel sections having selected hub sizes are snapped together to form the reel assembly. This is achieved as follows. The inclined outer end sections 32 and 32A of each of the adjacent pairs of ears 24 are located adjacent each other. This also positions the locking lips 36 and 36A in close circumferential relation to each other. The reel sections 11 and 12 are then rotated relative to each other until the adjacent lips 36 and 36A move into holes 34 and 34A. and the outer ends of lip edges 37 and 37A contact each other. The ear sections 31 and 31A are forced into engagement with each other and function as leaf springs that bias the base walls 21 and 21A into engagement with each other. The lips 36 and 36A prevent reverse relative circumferential movement between the reel sections and prevent relative radial movement between the reel sections.

While there are shown and described several sizes of reel assemblies and reel sections of the invention, it is understood that changes in material, sizes, and shapes of the reel sections may be made without departing from the invention. The invention is defined in the following claims.

I claim:

1. A reel assembly for accommodating an elongated ribbon of flexible sheet material comprising:
   a first reel section having a first hub and a first side member surrounding and attached to the first hub,
   a second reel section having a second hub and a second side member surrounding and attached to the second hub,
   each of said first and second hubs having a base wall and a plurality of ear means cooperating with each other to hold the first and second hubs in engagement with each other, each ear means includes an ear, each base wall having an arcuate slot located about each ear, each ear having a generally flat first section projected into the slot and a second section joined to the first section, said second section inclined outwardly from the plane of the base wall, said ears of the first reel section projected through the slots in the base wall of the second reel section, said ears of the second reel section projected through the slots in the base wall of the first reel section, said first sections of adjacent engaging ears being located in engagement with each other to hold the base walls of the first and second reel sections together, and lock means holding said first sections in engagement with each other for retaining the ear means in cooperative engagement with each other whereby the reel sections are locked together to form the reel assembly.

2. The reel assembly of claim 1 wherein: the first and second reel sections each have a circular outer rim and a plurality of spokes connecting the rim to the hub, each spoke having a generally radial rib.

3. The reel assembly of claim 1 wherein: the ear means comprises at least one ring of circumferentially spaced pairs of engaging ears.

4. The reel assembly of claim 1 wherein: the ear means comprise a pair of concentric rings of circumferentially spaced pairs of engaging ears, and said lock means comprise a ring of engaging lips retaining the pairs of ears in engagement with each other.

5. The reel assembly of claim 1 wherein: the first and second hubs each have a base wall, said base walls located side-by-side when the first and second reel sections are locked together.

6. A reel assembly for accommodating an elongated ribbon of flexible sheet material comprising; a first reel section having a first hub including a first base wall and a first side member surrounding and attached to the first hub, a second reel section having a second hub including a second base wall and a second side member surrounding and attached to the second hub, said first and second hubs having a plurality of ear means cooperating with each other to hold the first and second hubs in engagement with each other, and lock means for retaining the ear means in cooperative engagement with each other whereby the reel sections are locked together to form the reel assembly, said lock means comprises a plurality of first lips projected outwardly from the first base wall of the hub of the first reel section, and a plurality of second lips projected outwardly from the second base wall of the hub of the second reel section, said first and second base walls having holes adjacent the first and second lips, said first and second lips projected through adjacent holes and engageable with each other when the first and second reel sections are locked together.

7. The reel assembly of claim 6 wherein: said first and second hubs each have central bosses, each boss having an opening for accommodating a support for the reel assembly.

8. The reel assembly of claim 6 wherein: the first and second hubs each have a generally flat base wall located transversely of the axis of rotation of the reel assembly, said ear means and lock means being located on said base walls and said ear means holding said base walls in surface engagement with each other.

9. The reel assembly of claim 6 wherein: the first hub and second hub each have wall means projected laterally from the side member associated therewith, each wall means having a selected lateral dimension whereby the lateral dimension between said first and second side walls can be changed.

10. A reel assembly for accommodating an elongated ribbon of flexible sheet material comprising: a first reel section having a first hub and a first side member surrounding and attached to the first hub, a second reel section having a second hub and a second side member surrounding and attached to the second hub, each of said first and second hubs having a a base wall and a plurality of ear means cooperating with each other to hold the first and second hubs in engagement with each other, each ear means includes an ear, each base wall has an arcuate slot located about each ear, each ear having a generally flat first section projected into the slot and a second section joined to the first section, said second section inclined outwardly from the plane of the base wall, said ears of the first reel section projected through the slots in the base wall of the second reel section, said ears of the second reel section projected to the slots in the base wall of the first reel section, said first sections of adjacent engaging ears being located in engagement with each other to hold the base walls of the first and second reel sections together, and lock means for retaining the ear means in cooperative engagement with each other whereby the reel sections are locked together to form the reel assembly, said lock means comprising a plurality of first lips projected outwardly from the base wall of the hub of the first reel section, and a plurality of second lips projected outwardly from the base wall of the hub of the second reel section, said first and second base walls having holes adjacent said first and second lips, said first and second lips projected through adjacent holes and engageable with each other when the first and second reel sections are locked together.

11. The reel assembly of claim 10 wherein: the ear means comprise a pair of concentric rings of circumferentially spaced pairs of engaging ears, and said lock means comprise a ring of circumferentially spaced pairs of engaging lips retaining the pairs of ears in engagement with each other.

12. A reel assembly for accommodating an elongated ribbon of flexible sheet material comprising: a first reel section having a first hub and a first side member surrounding and attached to the first hub, a second reel section having a second hub and a second side member surrounding and attached to the second hub, said first and second hubs each having wall means projected laterally from the side member attached to the hub, and a base wall joined to the wall means, said base wall having a plurality of ears extended in a first circumferential direction, said ears comprising a pair of concentric rings of circumferentially spaced pairs of engaging ears, slot means surrounded each ear, and locking lip means for holding said ears in engagement with each other, said locking lip means comprising a ring of engaging lips retaining the pairs of ears in engagement with each other, said base wall having holes for accommodating adjacent lip means whereby the base walls of the first and second reel sections are located in general surface engagement with each other.

13. The reel assembly of claim 12 wherein: each wall means of said first and second hubs having a selected lateral dimension whereby the lateral dimension between said first and second side walls can be changed.

14. The reel assembly of claim 12 wherein: said first and second hubs each have central bosses, each boss having an opening for accommodating a support for the reel assembly.

15. The reel assembly of claim 12 wherein: the first and second reel sections each have a circular outer rim and a plurality of spokes connecting the rim to the hub, each spoke having a generally radial rib.

16. A reel assembly for accommodating an elongated ribbon of flexible sheet material comprising: a first reel section having a first hub and a first side member surrounding and attached to the first hub, a second reel section having a second hub and a second side member surrounding and attached to the second hub, said first and second hub each having wall means projected laterally from the side member attached to the hub, and a base wall joined to the wall means, said base wall having a plurality of ears extended in a first circumferential direction, slot means surrounding each ear, and locking lip means for holding said ears in engagement with each other, said base wall having holes for accommodating adjacent lip means whereby the base wall of the first and second reel sections are located in general surface engagement with each other, each ear having a generally flat first section projected into the slot and a second section joined to the flat first section, said second section inclined outwardly from the plane of the base wall, said ears of the first reel section projected through the slots in the base wall of the second reel section, said ears of the second reel section projected throguh the slots in the base wall of the first reel section, said flat sections of adjacent engaging ears being located in engagement with each other to hold the base walls of the first and second reel sections together with said locking lip means holding said flat sections in engagement with each other.

17. A reel assembly for accommodating an elongated ribbon of flexible sheet material comprising a first reel section having a first hub and a first side member surrounding and attached to the first hub, a second reel section having a second hub and a second side member surrounding and attached to the second hub, said first and second hub each having wall means projected laterally from the side member attached to the hub, and a base wall joined to the wall means, said base wall having a plurality of ears extended in a first circumferential direction, slot means surrounding each ear, and locking lip means for holding said ears in engagement with each other, said base wall having holes for accommodating adjacent lip means whereby the base wall of the first and second reel sections are located in general surface engagement with each other, said locking lip means comprises a plurality of first lips projected outwardly from the base wall of the hub of the first reel section, and a plurality of second lips projected outwardly from the base wall of the hub of the second reel section, said first and second lips projected through adjacent holes and engageable with each other when the first and second reel sections are locked together.

18. A reel assembly for accommodating an elongated ribbon of flexible sheet material comprising: a first reel section having a first hub and a first side member surrounding and attached to the first hub, a second reel section having a second hub and a second side member surrounding and attached to the second hub, said first and second hubs each having wall means projected laterally from the side member attached to the hub, and a base wall joined to the wall means, said base wall having a plurality of ears extended in a first circumferential direction, slot means surrounding each ear, and locking lip means for holding said ears in engagement with each other, said base wall having holes for accommodating adjacent lip means whereby the base wall of the first and second reel sections are located in general surface engagement with each other, each ear having a generally flat section projected into the slot and a generally semi-circular section joined to the flat section, said semi-circular section inclined outwardly from the plane of the base wall, said ears of the first reel section projected through the slots in the base wall of the second reel section, said ears of the second reel section projected through the slots in the base wall of the first reel section, said flat sections of adjacent engaging ears being located in engagement with each other to hold the base walls of the first and second reel sections together, said locking lip means comprises a plurality of first lips projected outwardly from the base wall of the first hub and a plurality of second lips projected outwardly from the base wall of the second hub, said first and second lips projected through adjacent holes and engageable with each other when the first and second reel sections are locked together.

19. A reel section comprising:
a hub,
a side member surrounding and attached to the hub, said hub having arcuate wall means projected laterally from said side member, and a base wall joined to the wall means, said base wall having a plurality of ears extended in a first circumferential direction, said base wall having a semi-circular slot located about each ear, each ear having a generally flat section projected into a slot and a generally semi-circular section joined to the flat section, said semi-circular section inclined outwardly from the plane of the base wall, and a plurality of lips facing in a direction opposite the first circumferential direction, said ears and lips adapted to cooperate with ears and lips of a second reel section to form a reel assembly.

20. The reel section of claim 19 wherein: said hub has a central boss, said boss having an opening for accommodating a support.

21. The reel section of claim 19 wherein: the side member has a circular outer rim and a plurality of spokes connecting the rim to the hub, each spoke having a generally radial rib.

22. The reel section of claim 19 wherein: said arcuate wall means comprises a plurality of arcuate walls separated from each other with a plurality of radial grooves in said hub.

23. The reel section of claim 19 including: a central boss joined to the base wall projected toward the plane of the side member, said boss having an opening for accommodating a support.

24. The reel section of claim 19 wherein: said plurality of ears comprise at least a pair of concentric rings of circumferentially spaced ears, and said lips comprising a ring of circumferentially spaced lips.

25. The reel section of claim 19 wherein: said base wall having a hole adjacent each of said lips, said holes being located in the direction opposite the first circumferential direction from said lips.

26. The reel section of claim 19 wherein: said arcuate wall means has a selected lateral dimension, said dimension being selectively variable to change the width of the hub.

* * * * *